United States Patent [19]

Burger et al.

[11] 4,403,849

[45] Sep. 13, 1983

[54] ELECTROSTATIC COPYING DEVICE

[75] Inventors: Erich Burger, Unterhaching; Horst Bickl; Hans-Peter Huber, both of Munich, all of Fed. Rep. of Germany

[73] Assignee: Agfa-Gevaert AG, Leverkusen, Fed. Rep. of Germany

[21] Appl. No.: 332,353

[22] Filed: Dec. 18, 1981

[30] Foreign Application Priority Data

Dec. 23, 1980 [DE] Fed. Rep. of Germany ....... 3048728

[51] Int. Cl.$^3$ ............................................ G03G 15/28
[52] U.S. Cl. ...................................................... 355/8
[58] Field of Search ............ 355/3 DR, 3 R, 8, 3 TE, 355/3 TR

[56] References Cited

U.S. PATENT DOCUMENTS 3,893,761 7/1975 Buchan ............................ 355/3 TR
4,116,557 9/1978 Kushima et al. ........................ 355/8
4,195,927 4/1980 Fotland et al. .................... 355/3 TE Primary Examiner—R. L. Moses
Attorney, Agent, or Firm—Michael J. Striker

[57] ABSTRACT

An electrostatic copying device comprises a transparent support plate onto which an original to be copied is placed. A slide carrying a recording cylinder provided on its peripheral surface with a photosensitive layer is movable beneath and parallel to the transparent support plate. At least one gear coaxially fixed to the recording cylinder meshes with a rack extending parallel to the path of movement of the slide to rotate the recording cylinder during movement of the slide. The slide carries also a raster objective stepwise scanning the original during movement of the slide to produce a latent image of the original on the photosensitive peripheral surface of the recording cylinder, which picture is transferred to an endless dielectric band forming an intermediate recording carrier and from the latter the picture is transferred to a photosensitive paper sheet fed onto the band along which also a plurality of usual treating stations are arranged for developing the image on the paper sheet.

23 Claims, 6 Drawing Figures

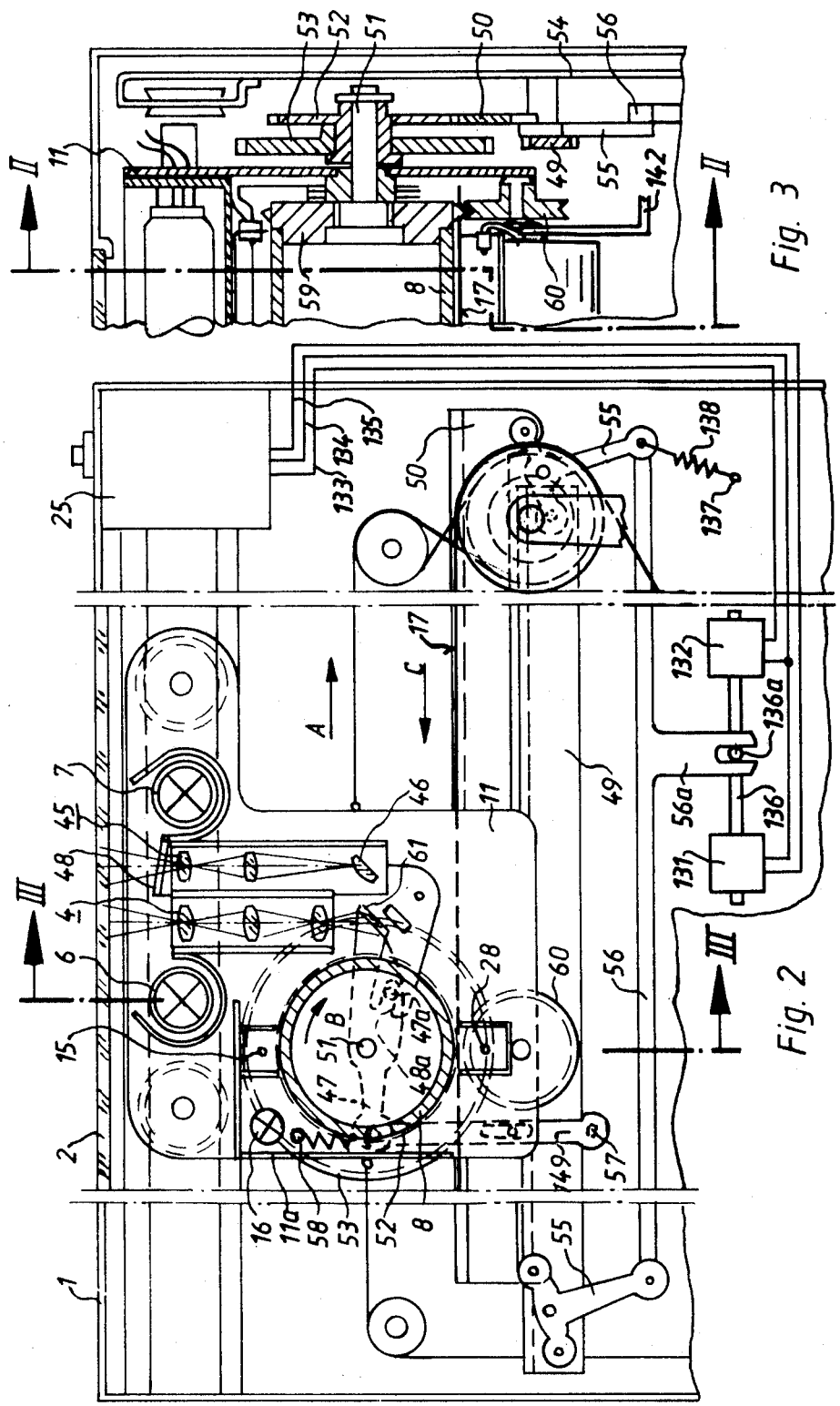

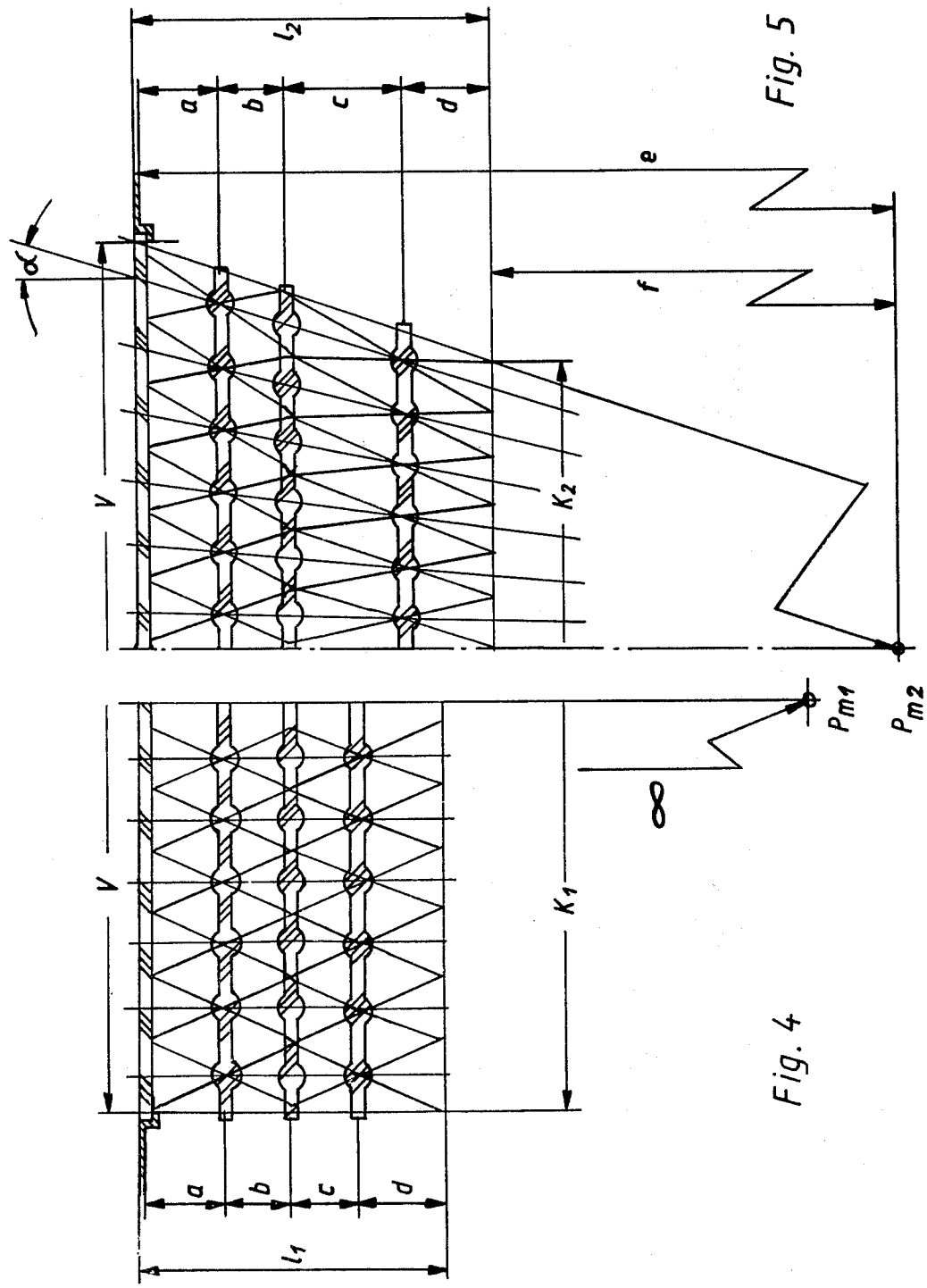

ELECTROSTATIC COPYING DEVICE

BACKGROUND OF THE INVENTION

The present invention relates to electrostatic copying devices in which an original is stripwise illuminated by means of a raster image reproducing system on a uniformly electrostatically charged emulsion carrier for the production of an electrostatic latent image.

A device of this type is for instance disclosed in the German Pat. No. 23 03 115 and the corresponding U.S. Pat. No. 3,592,592. Such copying devices provided with a raster image producing system have the advantage to produce with relatively little constructional expenditure a high-intensity image of the original on the copying carrier, whereby the original has to have only a small distance from the copy produced, which results in very small dimensions of the copying device.

A so-called book copy in which the original during the illumination process rests on a planar transparent support face of the copying device, is with this arrangement practically only possible when the light sensitive layer is arranged on a carrier which has at least a planar portion of a length corresponding to that of the original. Such a copying device is for instance disclosed in the German Offenlegungsschrift No. 24 21 661 and the corresponding U.S. Pat. No. 3,972,609. The therein used band-shaped recording carrier is especially subjected to considerable wear if it is provided with a layer of selenium which is especially suitable for electrophotographic purposes, but which is however relatively brittle.

SUMMARY OF THE INVENTION

It is an object of the present invention to provide a constructively simpler raster copying system with small dimensions which eventually may operate with different copying scales, and in which the recording carrier is not subjected to increased mechanical wear.

With these and other objects in view, which will become apparent as the description proceeds, the electrostatic copying device according to the present invention mainly comprises support means, a planar transparent support plate mounted on said support means for receiving a stationary original of predetermined length to be copied, a slide movable on a predetermined planar path along said transparent support plate, a recording cylinder having a photosensitive peripheral surface turnably mounted on the slide, raster objective means carried by said slide for producing an image of the original on the photosensitive surface of the cylinder, corona discharge means on said slide for uniformly charging the photosensitive surface before illuminating the same by the raster objective means, first drive means for moving the slide with a predetermined speed along said predetermined path from a starting position to an end position and for rotating said cylinder with a peripheral speed corresponding to the speed of the image produced by the raster objective means on the photosensitive surface of the cylinder, a band-shaped dielectric recording carrier extending along the predetermined path and having at least over the predetermined length of the original a planar portion, means on the slide for transmitting the charge image from the recording cylinder to said planar portion of the band-shaped recording carrier during movement of the slide in one direction along the predetermined path from the starting position to the end position, a plurality of treating stations arranged along the band-shaped recording carrier following the planar portion thereof for transmitting the image from the band-shaped recording carrier to a paper within a predetermined time period, and second drive means for moving, after transmission of the image from the recording cylinder to the band-shaped carrier, the recording cylinder in a direction opposite to said one direction back from the end to the starting position and simultaneously moving the band-shaped carrier in the same direction as the recording cylinder and both at the same speed corresponding to a speed according to the predetermined time period.

In this arrangement, the latent electrostatic image is produced on the recording cylinder provided on its peripheral surface with a layer of selenium or another known photoelectric layer, in which the actual photoelectric layer is not subjected to any mechanical strain. The application of the powder image and the other operating steps act on the dielectric recording carrier, which consists of a relatively elastic wear-resistant plastic material. An exchange of the recording carrier can therefore be carried out at longer time intervals as is necessary with conventional apparatuses of this type.

Despite the additional recording cylinder, there will result, with respect to known raster image reproducing systems, at only slightly increased distance between the original and the remaining image planes, if the recording cylinder has a sufficient periphery for the reception of the total intermediate picture. In so far as the timely regenerability of the photosensitive layer and the required copy speed permit, it is possible to improve this relationship by distributing the reproduction and transfer process onto a plurality of cylinder revolutions. The arrangement provides also advantageous possibilities for the exchangeable use of raster reproduction systems with different image scales, especially with regard to, in this case, simply obtainable drives for the recording carrier with corresponding transmission ratios for the different scales, and with regard to the possibility to arrange the practically short building one-to-one recording system closer to the recording cylinder than the longer building reducing systems.

An additional advantage of the system according to the present invention consists in that, due to the image reversal at the first image producing step, the dielectric recording carrier may rest, in the case of a one-to-one reproduction, during the transmission of the charge image.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a schematic cross section taken along the line II—II of FIG. 3 of a copying device according to the present invention provided with selectively usable means for producing the image of the original at different scales;

FIG. 3 is a cross section of the device shown in FIG. 2 taken along the line III—III of FIG. 2;

FIGS. 4 and 5 schematically illustrate the projection center at raster reproduction systems with different scales.

DESCRIPTION OF THE PREFERRED EMBODIMENTS

Figures 1, 6:
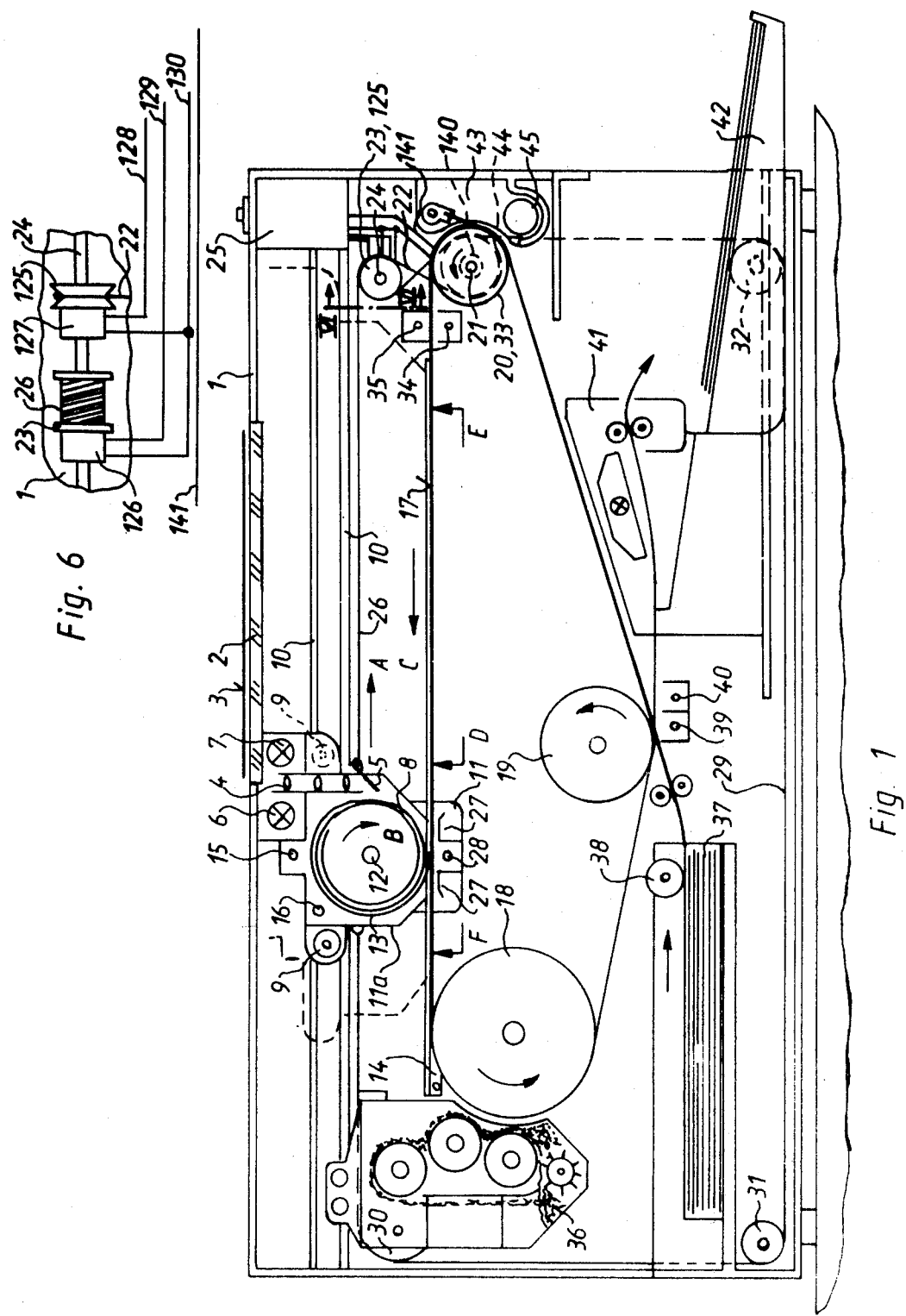
FIG. 1 is a schematic side view of a copying device according to the present invention.
FIG. 6 is a top view showing part of the device illustrated in FIG. 1.

In the embodiment shown in FIGS. 1 and 6, there is provided at the upper side of the device housing 1 a transparent support plate 2 for a stationary original 3 to be copied. The original 3 is stripwise scanned by a raster objective 4. The raster objective 4 is combined with a reversing mirror 5, which transmits the image produced by the raster objective in a mirror-inverse manner. For reversing the image it is also possible to use, instead of the reversing mirror, raster reproduction systems as disclosed in German Pat. No. 1,298,407 and the corresponding U.S. Pat. No. 3,580,675 or raster reproduction systems as disclosed in German Offenlegungsschrift No. 26 37 514, in which an uneven number of lens elements are combined with a mirror. The original 3 is illuminated during the scanning by illuminating tubes 6 and 7.

The picture is produced on a recording cylinder 8 provided on its peripheral surface with a selenium layer. The recording cylinder 8 is mounted on a slide 11 which is guided by means of rolls 9 on guide rails 10. The recording cylinder 8 is surrounded by a housing 11a mounted on the slide 11, which protects the surface of the recording cylinder from foreign exposure. The slide 11 is moved during the optical scanning process in the direction of the arrow A. For this purpose, the slide 11 is connected by means of a rope 26 with a rope pulley 23, which is mounted on a shaft 24 rotated by a non-illustrated motor. The rope pulley 23 can be coupled with the shaft 24 for rotation therewith by a magnet coupling 126 which in turn is connected by conductors 129 and 130 to a central control unit 25.

A gear 13 is mounted on the shaft 12 of the recording cylinder 8 for rotation therewith, and the gear 13 meshes with a stationary rack 14. The pitch diameter of the gear 13 corresponds to the outer diameter of the recording cylinder 8, which rotates in the direction of the arrow B, whereby the peripheral speed of the recording cylinder corresponds to the speed of the slide 11 in the direction of the arrow A. Due to the image reversal by the mirror 5, the image shift at the scale 1:1-producing raster objective 4 corresponds likewise to the peripheral speed of the recording cylinder 8 so as to produce a non-blurred reproduction of the original 3 onto the surface of the recording cylinder 8. A corona charging device 15 for uniformly charging the recording cylinder 8 is arranged upstream of the illuminating location, as considered in the direction of rotation of the cylinder 8. An infrared radiation device 16 provides for the regeneration of the photoconductive layer on the recording cylinder after such rotation of the same.

A dielectric band 17 serving as an intermediate recording carrier is arranged beneath the path of the recording cylinder 8. The dielectric band 17 is guided over an span rolls 18, 19 and 20. The peripheral surface of the rolls 18 and 20 are in a known manner slightly crowned, so that the band 17 may not laterally move. The band-shaped recording carrier, which for instance consists of a plastic film of 10-20 mm thickness, is driven over the span roll 20. For this purpose, the shaft 21 of the span roll 20 is driven by means of a pulley 23 which is connected by a roll or cable 22 with a pulley 125 mounted on the driven shaft 24. The pulley 125 may be connected at the suitable moment to the shaft 24 for rotation therewith by means of an electromagnetic coupling 127, which in turn is connected by conduits 128 and 130 to the control unit 25.

The band-shaped intermediate recording carrier 17 is guided by metal guide sheets 27 on the slide 11 in order to maintain during the charge transmission, which for instance is produced in a known manner as disclosed in U.S. Pat. No. 2,982,647, by means of the corona discharge device 28, the necessary small distance between band 17 and the cylinder 8 in an exact manner. In order to permit the recording cylinder 8 to roll without slipping on the recording carrier 17 during the transmission of the charge image, the latter has to remain at a standstill during the scanning and transmitting process.

After transmitting of the charge image, the recording carrier 17 is moved in the direction of the arrow C. The slide 11 is at the same time returned to its starting position by means of a rope 29 guided over guide rolls 30-32 and a pulley 44 on the shaft 21 connectable thereto by an additional magnet coupling 140 connected by the conduits 129 and 141 to the control unit 25. The slide 11 is thereby moved with the same speed as the intermediate recording carrier 17 so that the recording cylinder 8 during the return movement of the slide 11 contacts the recording carrier 17 only with a single line contact, so as not to disturb the transmitted charge image, and in order not to transmit charge particles onto the following portion of the recording carrier 17. The recording carrier is freed, before entering the charge transmitting stretch indicated by the two arrows D and E, of any residual charge, thus electrically neutralized, by two corona discharge devices 34 and 35 operated by alternating current. The distance between the arrow F and D indicates the lead distance which has to be passed through until the first surface portion of the recording carrier 8, which is charged from the corona charging device 15 and according to the image discharged by the raster objective 4, comes into contact with the recording carrier 17.

The further processing of the charge image transmitted to the recording carrier 17 proceeds in the usual manner. For this purpose, a magnet developing device 36, a paper stack 37 with a strip roll 38, a transmitting and take-off recording device 39 and 40, a quick fixing device 41, a receiving stack 42 and a scraper cleaning device 43 with a toner return spiral 45 are provided in the usual manner. The thereby resulting advantage with the arrangement according to the present invention is that, by the mentioned operating processes, especially by the scraper cleaning device, the sensitive and expensive selenium layer of the recording cylinder 8 is not mechanically stressed, but such stresses are transmitted only to the plastic band 17. The recording cylinder 8, which does not come into contact with the powder image, needs therefore eventually to be exchanged only at relatively long time intervals.

The distance between the original 3 and the intermediate recording carrier 17 is, due to the intermediate recording cylinder 8, even when the latter makes only one revolution per image length, only slightly enlarged with respect to directly copying raster copying systems. The constructive expenditure is thereby essentially smaller than in book copying devices with the usual equalizing mirrors.

FIGS. 2 and 3 illustrate an arrangement in which, besides the first at a scale 1:1 reproducing raster copying system 4, a second raster copying system 45 is provided, which for instance copies the original at the scale 1:$\sqrt{2}$. For simplification reasons, the last lens before the reversing mirror is constructed in the copying system 45 as a lens 46 combined with a mirror surface.

As can be ascertained from FIGS. 4 and 5, the reproduction scale of a raster projection system M is equal to K/B, and is given by $$m = b/a \cdot d/c,$$

that is, any desired reproduction scale can be obtained by any combination of the distances a–d. Thus, for instance it is possible to make the distance d substantially equal to the distance c and to choose both dimensions in such a manner as to bridge a relatively large distance to the rerecording carrier, whereby a desired reproduction scale is obtained solely by suitable choice of the distances a and b. However, it is also possible, as shown in the illustrated example, to choose the distance a substantially equal to the distance b, and to produce the desired reproduction scale by the relationship of the distances d and c.

On the other hand, the lattice constants or parameters of the individual raster planes have to be chosen in such a manner that the central rays of the partial systems of the raster reproduction system meet at a projection point P, which is spaced at the distances e and f respectively from the plane of the original and the plane of the intermediate recording carrier, as shown in FIG. 5, and which satisfy the equation $$m = f/e.$$

In the case of a 1:1 reproduction, the projection center $P_{ml}$ is at infinity, and the overall length of a 1:1 reproduction system can be chosen so small as is possible with respect to the arrangement of the illumination device. For other reproduction scales, the overall length $l_2$ is to be chosen in such a manner that the angle α of the central ray at the edge of the reproduction system becomes not too great. Therefore, the overall length of an enlarging or a reducing reproduction system is usually to be chosen slightly greater than the overall length of a 1:1 reproduction system, so that it is advisable to arrange the lattice system closer to the recording cylinder and to guide the rays of the other system around the 1:1 reproduction system.

The changeover between the two reproduction systems 4 and 45 is made possible in that the reversing mirror 61 is mounted on a tilting lever 47 and in that a tiltable shutter 48 is provided which covers one of the reproduction systems, and which is connected by a pin-and-slot connection 47a, 48a with the tilting lever 47. The tilting lever 47 is moved as will be described later on by means of a push rod 49.

In order to assure that the peripheral speed of the recording cylinder 8 corresponds to the chosen reproduction scale, two racks 49 and 50 are provided in the embodiment shown in FIGS. 2 and 3, which alternatingly can be brought into meshing engagement with a gear 52 or a gear 53 mounted on the shaft 51 of the recording cylinder 8 for rotation therewith. The engagement of the two racks 52 and 53 with the respective gear 52 or 53 is controlled by means of tilting levers 55 tiltably mounted on the side wall 54 of the housing, and which are connected to each other by a rod 56. A pin 57 at the bottom end of the push rod 49 abuts under the influence of a tension spring 58 onto the bottom face of the rack 49, so that during downward movement of the latter, or during the upward movement of the rack 50 which controls the 1:1 reproduction, the tilting mirror 61 is moved into the path of the rays of the reproduction system 4 while the reproduction system 45 for the other reproduction scale is covered by means of the shutter 48.

Since the relative speed between the recording cylinder 8 and the intermediate recording carrier 17 changes with the change of the reproduction scale, the recording carrier 17 is, in the embodiment shown in FIGS. 2 and 3, sliplessly connected with the movement of the recording cylinder 8. For this purpose, a sprocket wheel 59 is coaxially fixed, as best shown in FIG. 3, to one end of the recording cylinder 8, which engages in corresponding perforations provided along one edge of the recording carrier 17. Proper engagement between the sprocket wheel 59 and the perforations in the recording carrier 17 is assured by a counterwheel 60 turnably mounted on the slide 11. Evidently in this case all other drive connections of the recording carrier 17, that is the drive connection of the recording carrier 17 by means of the pulleys 125 and 33 as described in connection with the embodiments shown in FIGS. 1 and 6, as well as the drive connection with the respective racks 49 or 50, have to be disconnected from the recording carrier 17, which, with the exception of a reproduction at a scale of 1:1, does not remain any longer at standstill. As soon as the drive movement of the recording carrier 17 by means of the shaft 24, the coupling 107, the pulley 125, the rope 22 and the pulley 33 and roll 20 starts, the racks 49 or 50 must be disconnected from the respective gear in order to avoid a redundancy in the determination of the drive relations.

The tilting levers 55, which selectively bring the racks 49 and 50 into and out of engagement with the gears 53 and 59, are actuated by magnets 131 and 132 which are connected by conductors 133-135 with the control unit 25. The magnets 131 and 132 act on a common rod 136 which carries a pin 136a engaging in a slot provided on an arm 56a projecting laterally from the rod 56. One of the tilting levers 55 is further connected to one end of a return spring 138 which is connected at the other end to a stationary pin 137 and which holds when neither of the magnets 131, 132 is energized, the tilting levers 55 in an intermediate position in which both racks 49 and 50 are out of engagement with the corresponding gears 53 and 59.

The return movement of the slide 11 is produced as described in connection with the embodiment shown in FIG. 1. During this return movement of the slide it is not necessary to interrupt the drive connection of the carrier 17 with the sprocket wheel 59.

The further processing of the latent image is carried out in the same manner as described in connection with the embodiment shown in FIG. 1.

If in the embodiment illustrated in FIGS. 2 and 3 the length of the recording cylinder 8 and the length of the transparent support plate 2 are chosen in such a manner that originals of the size A3, that is 297×420 mm (according to German Industrial Norm DIN 476), may lengthwise be placed on the transparent support plate 2, then it is possible to produce the following copying operations, provided that the respectively correct paper formats are arranged in the stack 38 and that the control device 25 correctly controls the movement of the slide 11 and that of the recording carrier 17:

copying at a scale of 1:1 an original of the dimensions according to DIN A4 (210×297 mm) placed in transverse direction on the transparent plate 2 on a sheet of equal size taken in transverse direction from the stack 37;

copying at a scale of 1:1 a sheet with the dimensions DIN A3 (420×297 mm) placed in longitudinal direction on the transparent plate 2 on a corresponding sheet taken in longitudinal direction from the stack 37;

copying at a reduced scale of 1:$\sqrt{2}$ a single sheet of the dimensions DIN A3 placed in longitudinal direction on the transparent plate 2 or two sheets of the dimensions DIN A4 side-by-side in transverse direction on the transparent plate 2 on a single sheet of the dimensions DIN A4 taken in longitudinal direction from the stack 37.

It will be understood that each of the elements described above, or two or more together, may also find a useful application in other types of electrostatic copying devices differing from the types described above.

While the invention has been illustrated and described as embodied in an electrostatic copying device which includes a recording cylinder on a slide movable with respect to an intermediate recording carrier constituted by an endless dielectric band and a transparent support plate on which the original to be copied is to be placed, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that, from the standpoint of prior art, fairly constitute essential characteristics of the generic or specific aspects of this invention.

What is claimed as new and desired to be protected by Letters Patent is set forth in the appended claims:

1. An electrostatic copying device comprising support means, a planar transparent support plate mounted on said support means for receiving a stationary original of a predetermined size to be copied; a slide movable on a predetermined planar path beneath the transparent support plate; a recording cylinder having a photosensitive peripheral surface turnably mounted on said slide; raster objective means carried by said slide for producing an image of the original on said photosensitive surface of said cylinder; corona discharge means on said slide for uniformly charging said photosensitive surface before illuminating the same by said raster objective means; first drive means for moving said slide with a predetermined speed along said predetermined path from a starting to an end position and for rotating said cylinder with a peripheral speed corresponding to the speed of the image produced by said raster objective means on said photosensitive surface of said cylinder; a band-shaped dielectric recording carrier extending beneath said recording cylinder in the direction of said predetermined path and having at least over said predetermined length of the original a planar portion; means on said slide for transmitting the charge image from said recording cylinder to said planar portion of said band-shaped recording carrier during movement of said slide in one direction along said predetermined path from said starting to said end position; a plurality of treating stations arranged along said band-shaped recording carrier following said planar portion thereof for transmitting the image from said band-shaped recording carrier to a paper within a predetermined time period; and second drive means for moving, after transmission of the image from said recording cylinder to said band-shaped carrier, said recording cylinder in a direction opposite to said one direction back from said end position to said starting position and for simultaneously moving said band-shaped carrier in the same direction as said recording cylinder and both at the same speed corresponding to a speed according to said predetermined time period.

2. An electrostatic copying device as defined in claim 1, wherein said transmitting means on said carrier is a corona discharge device.

3. An electrostatic copying device as defined in claim 1, and including illuminating means on said slide for illuminating said original.

4. An electrostatic copying device as defined in claim 1, and including an infrared light source on said slide for regenerating the photosensitive peripheral surface thereof before applying a new image thereto.

5. An electrostatic copying device as defined in claim 1, wherein the length of the peripheral surface of said recording cylinder in circumferential direction is only part of the length of the movement of the slide from said starting to said end position.

6. An electrostatic copying device as defined in claim 1, wherein said first drive means comprises a stationary rack extending parallel to said predetermined path and a gear coaxially fixed to said recording cylinder and meshing with said rack, said gear having a pitch circle diameter which is equal to the outer diameter of said recording cylinder.

7. An electrostatic copying device as defined in claim 1, and including means on said slide for guiding said band-shaped recording carrier at a distance from the peripheral surface of said recording cylinder necessary for the transmission of said charge image from said recording cylinder to said band-shaped recording carrier.

8. An electrostatic copying device as defined in claim 1, wherein said first drive means include positive transmission means connecting said recording cylinder with said dielectric recording carrier.

9. An electrostatic copying device as defined in claim 8, wherein said positive transmission means comprise a sprocket wheel coaxially fixed to said recording cylinder for rotation therewith and engaging in perforations provided in said band-shaped recording carrier.

10. An electrostatic copying device as defined in claim 1, wherein said band-shaped recording carrier comprises an endless band and including a plurality of guide rolls guiding said endless band along a predetermined path including said planar portion of said band-shaped recording carrier, wherein said second drive means comprise a drive shaft and means connecting said drive shaft with one of said guide rolls for turning the latter.

11. An electrostatic copying device as defined in claim 10, wherein said connecting means comprise a roll coaxial with said one guide roll and driven from said drive shaft and disengageable coupling means for connecting and disconnecting said roll with said one guide roll.

12. An electrostatic copying device as defined in claim 11, wherein said disengageable coupling means is constituted by a magnet coupling.

13. An electrostatic copying device as defined in claim 1, wherein said photosenstive surface of said recording cylinder is constituted by a peripheral layer of selenium, and wherein said band-shaped dielectric recording carrier comprises a band of plastic material.

14. An electrostatic copying device as defined in claim 1, wherein at least two selectively operative raster objective means for images at different image scales are carried by said slide, and wherein said first drive means comprises means for selectively rotating said recording cylinder with a peripheral speed in correspondence with the respective image scale.

15. An electrostatic copying device as defined in claim 14, and including at least one tiltable shutter for masking the respective non-used raster objective means.

16. An electrostatic copying device as defined in claim 14, and including at least one tiltable mirror between one of said raster objective means and said recording cylinder.

17. An electrostatic copying device as defined in claim 14, wherein said means for selectively rotating said recording cylinder with a peripheral speed in a correspondence with the respective image comprise two gears of different diameters coaxially fixed to said recording cylinder, a pair of racks, and means for selectively moving one of said racks into engagement with one of said gears and the other rack out of engagement with the other gear, and vice versa, and wherein the ratio of the diameters of the pitch circles of the two gears to the outer surface of said recording cylinder corresponds to the respective image scale.

18. An electrostatic copying device as defined in claim 17, wherein the means for selectively moving a respective one of said racks into meshing engagement with the respective one of said gears comprises a parallelogram lever system mounted on said support means for moving the respective rack into engagement with the respective gear.

19. An electrostatic copying device as defined in claim 18, and including at least one tiltable shutter for masking one of said raster objective means and at least one tiltable mirror between the other raster objective means and said recording cylinder and control means cooperating with said parallelogram lever system for moving one of said racks into meshing engagement with the respective gear, said control means being constructed and arranged for controlling also tilting of said at least one shutter and said at least one mirror.

20. An electrostatic copying device as defined in claim 19, wherein said control means comprise tiltable lever means mounted on said slide for controlling tilting of said at least one shutter and said at least one mirror and an operating rod carried by said slide mounted at one end of said tiltable lever means and slidably engaging with the other end one of said racks on the side thereof facing away from the respective gear.

21. An electrostatic copying device as defined in claim 14, wherein said at least two raster objective means comprise a short raster objective means for reproduction of an original at a scale of 1:1 and a long raster objective means for reproduction of an original at a reduced scale, and wherein said short raster objective means is arranged closely adjacent said recording cylinder, and including means for guiding the rays passing through said longer raster objective means around said short raster objective means.

22. An electrostatic copying device as defined in claim 21, wherein the originals are sheets to be copied onto paper sheets fed onto said recording carrier, wherein said original sheets and said paper sheets fed onto the recording carrier are dimensioned according to the German Industrial Norms, and wherein said long raster objective means copies said original at a reduced scale of $1:\sqrt{2}$ on a sheet fed onto said recording carrier.

23. An electrostatic copying device as defined in claim 22, wherein a plurality of electrophotographic treating stations are arranged along said recording carrier for transmitting the charge image from the latter onto a sheet fed onto said recording carrier and for developing the image on said sheet.

* * * * *